United States Patent
Sachet et al.

(10) Patent No.: US 12,019,208 B2
(45) Date of Patent: Jun. 25, 2024

(54) SURFACE WITH TUNABLE EMISSIVITY BASED ON EPSILON-NEAR-ZERO MATERIALS AND PATTERNED SUBSTRATES

(71) Applicant: Third Floor Materials, Inc., Raleigh, NC (US)

(72) Inventors: Edward Sachet, Raleigh, NC (US); Christopher Shelton, Cary, NC (US)

(73) Assignee: THIRD FLOOR MATERIALS, INC., Raleigh, NC (US)

( * ) Notice: Subject to any disclaimer, the term of this patent is extended or adjusted under 35 U.S.C. 154(b) by 384 days.

(21) Appl. No.: 17/354,686

(22) Filed: Jun. 22, 2021

(65) Prior Publication Data

US 2021/0405256 A1 Dec. 30, 2021

Related U.S. Application Data

(60) Provisional application No. 63/046,175, filed on Jun. 30, 2020.

(51) Int. Cl.
*G02B 1/00* (2006.01)
*G02B 5/20* (2006.01)

(52) U.S. Cl.
CPC .............. *G02B 1/002* (2013.01); *G02B 5/208* (2013.01)

(58) Field of Classification Search
CPC ........ G02B 1/002; G02B 1/005; G02B 5/208; G02B 26/02; G02B 6/1225; G02B 6/1226; B82Y 20/00; G02F 2203/10; G02F 2203/11; G02F 2202/30
See application file for complete search history.

(56) References Cited

U.S. PATENT DOCUMENTS

| | | | |
|---|---|---|---|
| 8,995,055 B1 * | 3/2015 | Feng | G02B 5/208 |
| | | | 359/360 |
| 2018/0180331 A1 * | 6/2018 | Yu | F24S 70/60 |
| 2018/0329114 A1 * | 11/2018 | Anopchenko | G02F 1/015 |
| 2018/0350922 A1 | 12/2018 | Sachet et al. | |
| 2019/0094435 A1 * | 3/2019 | Shen | G02F 1/133528 |

* cited by examiner

*Primary Examiner* — Stephone B Allen
*Assistant Examiner* — Adam W Booher
(74) *Attorney, Agent, or Firm* — Myers Bigel, P.A.

(57) ABSTRACT

A device includes a substrate having a pattern of surface features on a surface thereof, and a layer including a material having an Epsilon-Near-Zero (ENZ) condition for a wavelength range. The layer extends on the surface of the substrate and along the pattern of surface features. Related devices and fabrication methods are also discussed.

32 Claims, 7 Drawing Sheets

SURFACE WITH TUNABLE EMISSIVITY BASED ON EPSILON-NEAR-ZERO MATERIALS AND PATTERNED SUBSTRATES

CLAIM OF PRIORITY

This application claims priority from U.S. Provisional Application Ser. No. 63/046,175 field on Jun. 30, 2020, the disclosure of which is incorporated by reference herein in its entirety.

FIELD

The present invention relates to devices or surfaces with tunable absorptivity/emissivity.

BACKGROUND

Thermal emission and polaritonic absorption (e.g., in infrared wavelength ranges) may be linked through the property known as absorptivity or emissivity. Thermal emission is a fundamental physical phenomenon. Objects at temperatures above absolute zero (0K) radiate electromagnetic energy, which results in broadband, omnidirectional light emission with an emission spectrum dictated by the object's temperature. For a perfect (idealized) blackbody, the relationship between temperature and the emitted spectrum is described by Planck's law of thermal radiation:

$$B(\lambda, T) = \frac{2hc^2}{\lambda^5} \cdot \frac{1}{e^{\frac{hc}{\lambda k_B T}} - 1}$$

where B describes the amount of energy the blackbody emits at different radiation wavelengths ($\lambda$) for a given temperature (T). It is the power emitted per unit area of the body, per unit solid angle of emission, per unit of wavelength, with h being the Planck constant, $k_B$ being the Boltzmann constant and c being the speed of light.

FIG. 1 depicts the spectral behavior for an ideal blackbody at varying temperature levels (shown with reference to three temperatures at 400, 500, and 600 Kelvin (K)) at a spectral range from 400 to 16000 nm wavelength. With increasing temperature, the spectral emission maximum shifts to shorter wavelengths (higher energies) and the overall emitted power increases over the entire spectral range. For an ideal blackbody, the temperature is the only variable that allows changing of the spectral position of the emission maximum.

In recent years there has been effort in engineering this spectrum away from the ideal blackbody to achieve thermal emission that is not blackbody like, providing thermal emission that does not exhibit the characteristic spectral shift in emission maximum as a function of temperature and has a narrower, temperature stable band of emitted frequencies. Such an emitter device can be achieved relying on different physics, for example electron-hole recombination that is used in lasers and light emitting diodes. For thermal emission, e.g. the creation of light by heating an object, controlling the spectral output has been challenging, for example, due to the characteristic of real world objects called the emissivity. Emissivity ($\varepsilon$) is the property that describes how much a real world object diverges or deviates in its emissive properties from the ideal black-body behavior.

A blackbody has a uniform emissivity of $\varepsilon=1$. A grey body is defined as a body with constant emissivity over all wavelengths and temperatures with $\varepsilon<1$. Such a body does not exist in practice but the assumption is a good approximation for many objects used in engineering. A greybody with an emissivity of $\varepsilon=0.8$ would exhibit an emission spectrum with exactly 80% of the power emitted at any given wavelength and temperature when compared to the ideal black-body. In reality, the emissivity of an object is a function of wavelength ($\varepsilon(\lambda)$) and does not remain constant over the entire electromagnetic spectrum. For example, the emissivity of metals can vary dramatically from the infrared (IR) (low emissivity) to the ultraviolet (UV) (high emissivity) wavelength ranges within the same material.

Controlling and manipulating an object's emissivity would allow creating objects with targeted thermal emission spectra. One-way of doing so is to manipulate an object's absorptivity, thus to engineer absorption bands for a material at energies wanted for thermal emission. Kirchoff's law of thermal radiation links the emissivity and absorption of an object at thermal equilibrium. For a given energy, the emissivity of an object is equal to its absorption. A material may then emit radiation at wavelengths identical to those at which it absorbs when its temperature is perturbed (i.e. heated). The resulting emission spectrum I($\lambda$, $\theta$, T) can be characterized as:

$$I(\lambda,\theta,T) = \epsilon_\lambda(\theta) \times I_{BB}(\lambda,T)$$

where $\epsilon_\lambda(\theta)$ is the frequency dependent emissivity (absorptivity) at angle $\theta$, and $I_{BB}(\lambda,T)$ is the blackbody radiation spectrum for a given wavelength and temperature. One may effectively consider the emissivity of an object as a spectral filter that modifies the black-body emission/absorption in a unique fashion to produce a material's distinctive radiative or absorptive signature. Alternatively speaking, the absorptivity of an object defines the absorbing characteristics as a function of wavelength when compared to a blackbody, which is by definition a perfect absorber (complete absorption of incoming light at all wavelengths). These two characteristics (emissivity and absorptivity) may be considered interchangeable and may describe the same physical property of a body, e.g. how it interacts with incoming electromagnetic light and (as defined by Kirchoff s law) how the body emits light when at temperatures above 0K, generally described herein as emissivity/absorptivity characteristics.

This relation can be used to engineer narrower band thermal emission from photonic crystals and other designer metamaterial structures. Some conventional designs for narrow-band thermal emitters may rely on complex microfabrication of textured surfaces or photonic crystals. Recently, however, improved understanding and processes in creating materials where the real part of the dielectric permittivity vanishes at controllable energies has opened possibilities for the control of the emissivity/absorptivity. These materials may offer similar or better quality factor (spectral narrowness) of emissivity/absorptivity in a simpler, less costly structure that may be fabricated on large scales.

Thin films made of metals, doped semiconductors, or polar materials can support plasmon- or phonon-polariton eigenmodes (i.e. intense optical absorption events). One mode that has been successfully integrated into opto-electronic technologies such as sensors and emitters is surface plasmon polariton (SPP). However, due to the carrier concentration range that may be accessible in conductive metal oxides (CMOs) and doped semiconductors, access to other optical eigenmodes may become practical. Within polaritonic films, the evanescent fields at the interface between polaritonic and dielectric media can result in a strong compression of the free-space wavelength and a focusing of the electromagnetic fields. These fields are almost exclusively confined in the dielectric region, as the negative permittivity of the polaritonic medium may exclude these fields. In thin films where the polaritonic wavelength is on the order of or much larger than the thickness of the polaritonic film, the evanescent fields on opposing sides (e.g. top and bottom interfaces of the polaritonic film) may cause the two polaritons to hybridize. This hybrid mode is the result of strong coupling phenomena at the epsilon-near-zero (ENZ) condition of the material.

Two types of modes may be present at the ENZ condition: 1) the Berreman mode, which occurs to the left of the light line at the ENZ condition (smaller wavevector) and can couple to free-space, and 2) the ENZ-polariton, observed at higher momenta (wavevector) and thus requires slowing of the incident light to observe, akin to more traditional polaritonic measurement. Both the Berreman and ENZ-polariton occur at similar frequencies, and these terms have been used interchangeably. Herein, Berreman mode and ENZ-polariton may be collectively described as ENZ modes that can facilitate ENZ absorption. Salient characteristics of these absorptive modes may include a relatively non-dispersive nature that results in a deep, narrowband optical absorption of IR light in ultrathin films, with strong electromagnetic field concentration inside the volume of the polaritonic layer. The wavelength at which a material transitions from dielectric to metallic behavior (that is, the ENZ condition) defines the frequency at which the ENZ mode occurs.

The ENZ modes focus the incoming electromagnetic radiation upon absorption substantially or almost exclusively within the volume of the ENZ medium. In contrast, SPP absorption focuses the incoming electromagnetic radiation as a bound surface wave, with most of the electromagnetic field concentrated at the interface of the plasmonic film and the dielectric environment. The surface wave may decay exponentially away from the interface into the surrounding dielectric and little to almost no field concentration may permeate the plasmonic film. For a thin film to support a SPP, its real part of the dielectric function ($\varepsilon_1$) has to be negative ($\varepsilon_1 < -1$), thus it exhibits metallic behavior and expels electromagnetic fields. In contrast, the ENZ modes exist at a resonant energy that is approximately equal to the zero point of the real part of the dielectric function ($\varepsilon_1 \approx 0$). For some metals, semiconductors and CMOs, this can be approximated as the material's plasma frequency $\omega_p$. The plasma frequency is given by:

$$\omega_p = q \sqrt{\frac{n_e}{m_e \varepsilon_0}}$$

where $n_e$=carrier density, $m_e$=effective mass, $\varepsilon_0$=free space permittivity and q=elementary charge.

From this relationship, the impact of carrier density $n_e$ on the material's plasma frequency $\omega_p$ can be seen given the range (four to five orders of magnitude) of carrier density values that are possible in many materials. A variation in carrier concentration impacts the optical properties of the Drude conductor, which can be described using the complex dielectric function:

$$\varepsilon = \varepsilon_1 + i\varepsilon_2 = \varepsilon_\infty + \frac{\omega_p^2}{(\omega \cdot \gamma \cdot i) \cdot \omega^2} \text{ with } \gamma = \frac{q}{\mu m_e}$$

where $\varepsilon_1$ and $\varepsilon_2$ are the real and imaginary portions of the dielectric function respectively, $\gamma$=damping force, $\varepsilon_\infty$=high frequency dielectric constant and $\mu$=free carrier mobility.

The Drude function establishes the position of the resonant ENZ mode ($\varepsilon_1 \approx 0$) as a function of a material parameter; the high frequency dielectric constant ($\varepsilon_\infty$), and the free carrier concentration ($n_e$). Varying the carrier concentration, as may be done in semiconductors through doping, allows tuning of the resonance within a wavelength range bounded by the material's accessible doping density.

FIG. 2 depicts this behavior by plotting the real part of the Drude law derived dielectric function for a generic semiconductor at three levels of free carrier concentration n. For the three traces, the dashed arrow indicates the increasing carrier concentration n. With higher n, the zero crossing of the dielectric function from positive (dielectric) into negative (metallic), the ENZ condition (illustrated at the zero crossing on the y-axis), is shifted to shorter wavelengths along the x-axis (higher energies). In practical applications with real world materials, this can be achieved by increasing the free carrier concentration via doping. The ENZ condition may be unique in that it allows the optical material properties to be changed by large margins without substantially changing the chemical composition of the material. Typical doping levels may be well below 1 at. % (atomic percent), however these small changes can allow to widely influence the optical behavior of the ENZ material or layer or medium. An ENZ material or layer or medium may refer to a material or layer or medium that is configured to provide ENZ absorption, that is, concentration of electromagnetic field substantially or almost exclusively within the volume of the material or layer or medium, at a predetermined wavelength or wavelength range.

Under certain conditions, the resonant ENZ eigenmode can result in complete or substantially complete extinction of reflected and transmitted light within the operational medium—i.e., complete or substantially complete absorption. In ENZ layers only tens of nm thick, infrared light can be completely absorbed. The link between the strong optical absorption due to an ENZ mode and the emissivity of the material can be described using Kirchoff's law of thermal radiation. Stated simply, at a given energy and at equilibrium, the emissivity of an object is equal to its absorption at the same frequency. Thus, when a material that supports an ENZ absorption mode is heated, the material may emit thermal radiation (e.g., visible and/or non-visible radiation) at frequencies wherever it absorbs (the ENZ mode).

Due to the polaritonic nature of the ENZ mode, this absorption may not be a uniform phenomenon such as for example a molecular absorption in a dye. Certain beam conditions may be required for incident light to couple into the mode and thus to be absorbed. For a thin, flat ENZ film, certain constraints may have to be met to achieve ENZ absorption (e.g., the in plane wave vector of the incoming light and the ENZ mode need to be matched). For example, for a thin ENZ layer on a reflective surface such as a metallic substrate, only p-polarized light (having an electric field vector that is parallel to the plane of incidence of the incident light) may couple to the mode. In addition, normal incident light (defined as 0° in a direction perpendicular to the surface, with 90° being parallel to the surface) may not couple to the mode, as the incident light may need to be at an angle off the surface normal. This angle, energy, and polarization dependency is graphically illustrated in FIGS. 3 and 4.

FIG. 3 shows the energy dependence (E) of absorption for a generic ENZ absorber on a metallic substrate around the ENZ condition for p- and s-polarized (electric field vectors perpendicular to plane of incidence) light at 60° off surface normal incidence angle (0°). Approaching the resonant condition in energy E, the absorptivity (A) reaches a value of almost 1 (complete absorption) for p-polarized light and tapers off at higher and lower energies respectively as the dielectric function (see FIG. 2) diverges from the zero condition to either positive (dielectric) or negative (metallic) values. S-polarized light may not interact with the ENZ medium and shows no increase in absorption (the material does not absorb the s-polarized light and the metallic substrate remains highly reflective).

In FIG. 4, the generic ENZ absorber on the metallic substrate is used to depict the angle dependence at the example optimum ENZ energy (i.e., the peak shown in FIG. 3) for p- and s-polarized light. Increasing the incident angle, the absorptivity (A) reaches a value of almost 1 (complete absorption) for p-polarized light around 60° and then steeply decreases approaching the surface parallel at 90°. S-polarized light may not interact with the ENZ medium and shows no increase in absorption (the material does not absorb the s-polarized light and the metallic substrate material remains highly reflective).

Applying Kirchoff's law, such a material system can emit at very specific energies, the energy of the ENZ condition. This condition and the resulting absorption band can be tuned across the electromagnetic spectrum, thus the emissivity/absorptivity can be tuned so as to create a surface that has an emissivity/absorptivity profile that varies significantly from the idealized case of a blackbody, provided the polarization and angle requirements for coupling to the ENZ mode are met. For the generic ENZ absorber discussed above this would be the case for p-polarized light and at angles off the surface normal. However, at energies off the ENZ condition, the emissivity/absorptivity may be very low. In particular, as noted above, an example sample configuration of a thin ENZ film on a metallic substrate may be limited to emission/absorption of polarized (p-pol) light at certain angles off or other than the surface normal (see FIG. 4).

SUMMARY

According to some embodiments of the present invention, a device includes a substrate comprising a pattern of surface features on a surface thereof, and a layer comprising a material having an Epsilon-Near-Zero (ENZ) condition for a wavelength range. The layer is on the surface of the substrate and extends along the pattern of surface features.

In some embodiments, the device further includes a reflector layer extending along the pattern of surface features between the layer and the surface of the substrate. A surface of the layer opposite the reflector layer may have a peak emissivity/absorptivity in the wavelength range.

In some embodiments, the pattern of surface features is configured to orient the layer such that emissivity/absorptivity thereof in the wavelength range is substantially independent of a polarization and/or an angle of radiation.

In some embodiments, the surface features and/or the pattern thereof comprise at least one dimension that is determined based on the wavelength range.

In some embodiments, the material comprises a doped semiconductor.

In some embodiments, the wavelength range is about 2 micrometers (μm) to about 16 μm.

In some embodiments, the pattern of surface features defines a square or hexagonal lattice in plan view.

In some embodiments, the square lattice comprises a lattice parameter of about 0.5 to about 3 times a wavelength in the wavelength range, or about 3 micrometers (μm) to about 18 μm.

In some embodiments, the hexagonal lattice comprises a lattice parameter of about 0.3 to about 3 times a wavelength in the wavelength range, or about 2 micrometers (μm) to about 7 μm.

In some embodiments, the at least one dimension comprises a respective height of the surface features. The respective height is about 0.2 to about 2 times a wavelength in the wavelength range, or about 1 micrometer (μm) to about 5 μm.

In some embodiments, the at least one dimension comprises an aspect ratio of a height to a width of the surface features. The aspect ratio is about 0.2 to about 3.

In some embodiments, the surface features define respective shapes protruding from the surface of the substrate. The respective shapes comprise semi-spheres, ellipsoids, paraboloids, hyperboloids, triangular base pyramids, and/or square base pyramids.

In some embodiments, the pattern of surface features defines a periodic pattern along one or more directions on the surface of the substrate.

In some embodiments, an average pitch between adjacent ones of the surface features is about 2 micrometers (μm) to about 7 μm.

In some embodiments, the layer comprises a plurality of sublayers having respective ENZ conditions for one or more subranges of the wavelength range.

In some embodiments, the plurality of sublayers comprise three or more sublayers comprising different materials and/or different doping concentrations.

In some embodiments, the material having the ENZ condition comprises GaAs, InAs, InN, GaN, CdO, ITO, ZnO, CdZnO, and/or doped variants thereof.

In some embodiments, the substrate comprises Si, Ge, GaAs, $Al_2O_3$, ZnO, GaN, Ge, $SiO_2$, BK7 glass, and/or technical glasses.

In some embodiments, the reflector layer comprises Ag, Au, Al, and/or W.

In some embodiments, the reflector layer comprises a layer stack including an adhesion layer on the surface of the substrate and extending along the surface features. The adhesion layer comprises Mg, Ni, Ti, and/or Cr and has a thickness of less than about 100 nanometers (nm).

In some embodiments, the material having the ENZ condition comprises doped CdO, the reflector layer comprises Au, and the substrate comprises $Al_2O_3$.

According to some embodiments of the present invention, a device includes a reflector layer; and an Epsilon-Near-Zero (ENZ) material layer on the reflector layer. The ENZ material layer comprises a surface opposite the reflector layer having an ENZ condition in a wavelength range of about 2 micrometers (μm) to about 16 μm.

In some embodiments, emissivity/absorptivity of the ENZ material layer in the wavelength range is substantially independent of a polarization and/or an angle of radiation.

In some embodiments, the device further includes a substrate comprising a pattern of surface features. The reflector layer and the ENZ material layer are sequentially stacked on the substrate and extend along the pattern of surface features.

In some embodiments, the surface features and/or the pattern thereof comprise at least one dimension that is determined based on the wavelength range.

In some embodiments, the pattern of surface features defines a square or hexagonal lattice in plan view.

In some embodiments, the ENZ material layer comprises a plurality of sublayers having respective ENZ conditions for one or more subranges of the wavelength range.

In some embodiments, the plurality of sublayers comprise three or more sublayers comprising different semiconductor materials and/or different doping concentrations.

In some embodiments, the ENZ material layer comprises GaAs, InAs, InN, GaN, CdO, ITO, ZnO, CdZnO, and/or doped variants thereof.

According to some embodiments of the present invention, a method of fabricating a surface with emissivity/absorptivity for a wavelength range includes providing a substrate comprising a pattern of surface features on a surface thereof, and forming a layer on the surface of the substrate and extending along the pattern of surface features, where the layer comprises a material having an Epsilon-Near-Zero (ENZ) condition for a wavelength range.

In some embodiments, the method further includes forming a reflector layer on the surface of the substrate and extending along the pattern of surface features prior to forming the layer having the ENZ condition. A surface of the layer opposite the reflector layer comprises a peak emissivity/absorptivity in the wavelength range.

In some embodiments, the pattern of surface features is configured to orient the layer such that emissivity/absorptivity thereof in the wavelength range is substantially independent of a polarization and/or an angle of radiation.

In some embodiments, the surface features and/or the pattern thereof comprise at least one dimension that is determined based on the wavelength range.

In some embodiments, the material comprises a doped semiconductor, and the wavelength range is about 2 micrometers (μm) to about 16 μm.

In some embodiments, the pattern of surface features defines a square or hexagonal lattice in plan view.

In some embodiments, the layer comprises a plurality of sublayers having respective ENZ conditions for one or more subranges of the wavelength range.

In some embodiments, the plurality of sublayers comprises three or more sublayers comprising different materials and/or different doping concentrations.

In some embodiments, the material having the ENZ condition comprises GaAs, InAs, InN, GaN, CdO, ITO, ZnO, CdZnO, and/or doped variants thereof.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

Figure 1:
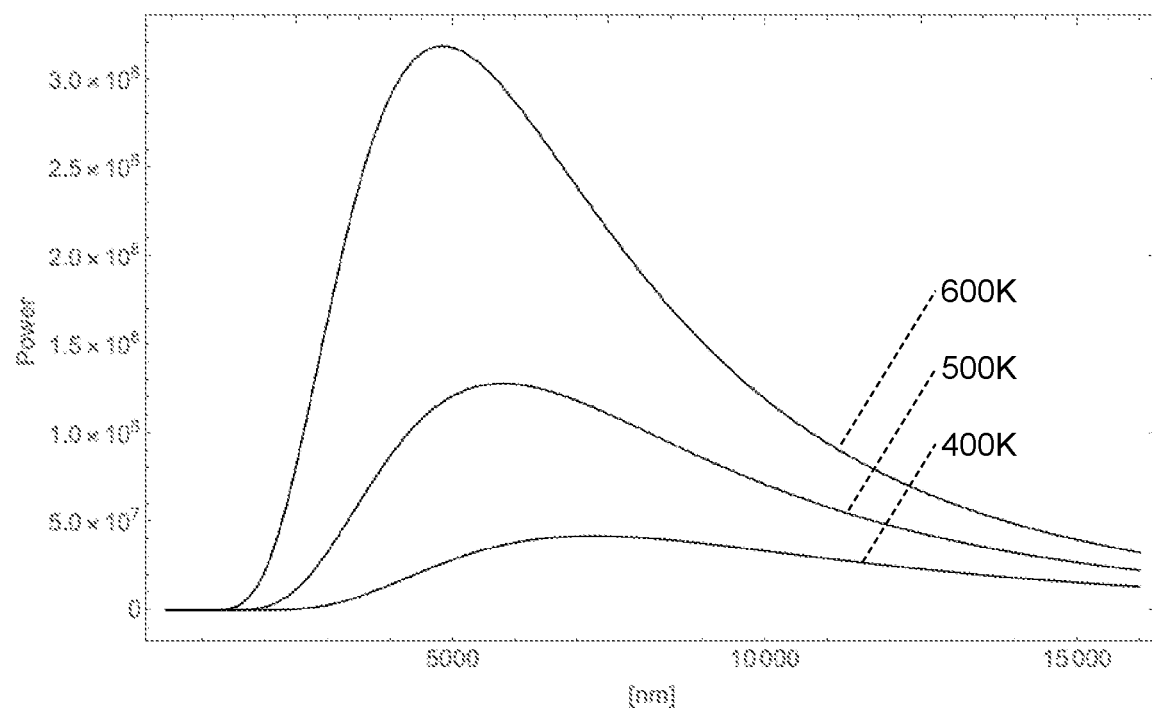
FIG. 1 is a graph illustrating the blackbody radiation spectrum for three temperatures ranging from 400-600 Kelvin at a spectral range from 400 to 16000 nm wavelength.

Embodiments of the present invention provide surfaces with tunable emissivity/absorptivity characteristics based on ENZ layer absorption. In particular, embodiments of the present invention achieve tunable narrowband emissivity/absorptivity for unpolarized or non-polarized light utilizing ENZ materials. The resulting engineered surfaces allow access to the emissivity/absorptivity at incident light angles at and around the surface normal (referred to herein as 0° in a direction perpendicular to the surface) and beyond.

As used herein, the ENZ condition refers to a material property, specifically, a transition from dielectric to metallic behavior, with respect to a particular wavelength or wavelength range. The wavelength or wavelength range of the ENZ condition defines the frequency (proportional to the material's plasma frequency $\omega_p$) or frequency range at which ENZ absorption modes occur. The ENZ absorption modes (also referred to herein as ENZ modes) allow for focus or concentration of incoming electromagnetic radiation (such as incident light) substantially or almost exclusively within the volume of a layer or medium, which is referred to herein as ENZ absorption. A material having an ENZ condition for a predetermined wavelength range (i.e., a material that is configurable to provide ENZ absorption at the wavelength range at which the material transitions from dielectric to metallic behavior) is referred to herein as an ENZ material. An ENZ material may also be configured to emit electromagnetic radiation (or thermal radiation, e.g., when heated) at the frequency or frequency range of the ENZ mode, that is, at the wavelength or wavelength band of the ENZ condition, as defined by Kirchhoff's law of thermal radiation. While primarily described herein with reference to ENZ materials formed as a film or layer, it will be understood that embodiments of the present invention are not limited to a particular layer thicknesses, and may include one or more layers of any thickness or thicknesses that are configured to provide ENZ absorption modes as described herein.

Some embodiments of the present invention provide structures and related fabrication methods that can tailor a surface emissivity/absorptivity towards a designated wavelength band or multiple wavelength bands (e.g., in the infrared portion of the electromagnetic spectrum), while suppressing emission and absorptions at out-of-band energies. Control of a surface's emissivity/absorptivity may be used to control the thermal signature of a surface upon heating, and/or to design surfaces with predictable and controllable absorptions (e.g., in the infrared, visible, and/or ultraviolet wavelength ranges). The emissivity/absorptivity curve (emissivity/absorptivity vs. wavelength) can determine the expected thermal radiation spectrum for a given temperature and conversely the surface's absorption spectrum. In addition, some embodiments of the present invention may allow for the control of the angle-dependent and/or polarization-dependent emissivity/absorptivity, and thus, the emission/absorption behavior of a surface as a function of angle (and temperature).

In some embodiments, the devices/surfaces described herein may include or may otherwise be based on the deposition of a material layer or film that is configured to provide Epsilon-Near-Zero (ENZ) absorption (also referred to herein as an ENZ material or layer), in some instances on a patterned substrate material (e.g., a 3D patterned substrate surface). The combination thereof may allow for the tuning of the surface emissivity/absorptivity across the desired (e.g., infrared) spectrum with distinct maxima in the emissivity/absorptivity at the designed wavelengths of operation. In some embodiments, the tunable center energies range from about 2-16 μm in wavelength, for example, about 3-5 μm and/or 8-12 μm, which may correspond to atmospheric windows of transparency to infrared light. Applications may include, but are not limited to infrared calibration targets, and surfaces with synthetic infrared absorption signature. When heated, these surfaces can be employed as thermal emitters with a decidedly non-blackbody like emission spectrum with a tunable, narrow emission band at a selectable wavelength range (e.g., about 400 nm to about 2 μm, or about 2 μm to about 16 μm for infrared applications).

Figure 5:
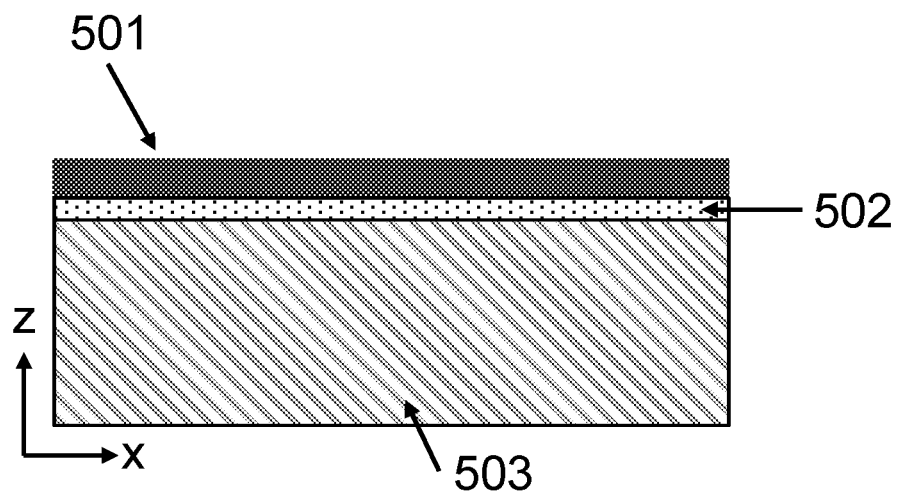
FIG. 5 is a schematic cross-sectional view illustrating structures according to some embodiments of the present invention.

In an example embodiment, tuning of surface emissivity/absorptivity can be achieved by combining a layer of a polaritonic ENZ material on top of a reflective backing or layer (referred to herein as a reflector layer), both on a substrate material. FIG. 5 illustrates a device in accordance with some embodiments of the present invention. The topmost layer 501 is the polaritonic ENZ layer, and the reflector layer is depicted as layer 502 on a surface of the substrate 503. In the example of FIG. 5, the substrate 503 is shown as having a flat or substantially planar surface. The layer 501 is doped or otherwise configured to have the ENZ condition for the target wavelength range. The reflector layer 502 may include one or more materials having high reflectivity for the target wavelength range, so as to improve light coupling into the ENZ mode. The emissivity/absorptivity behavior of the layer 501 can be tuned by controllably enhancing and suppressing emission/absorption of radiation in bands across the target wavelength range, governed by the ENZ mode of layer 501.

Figure 2:
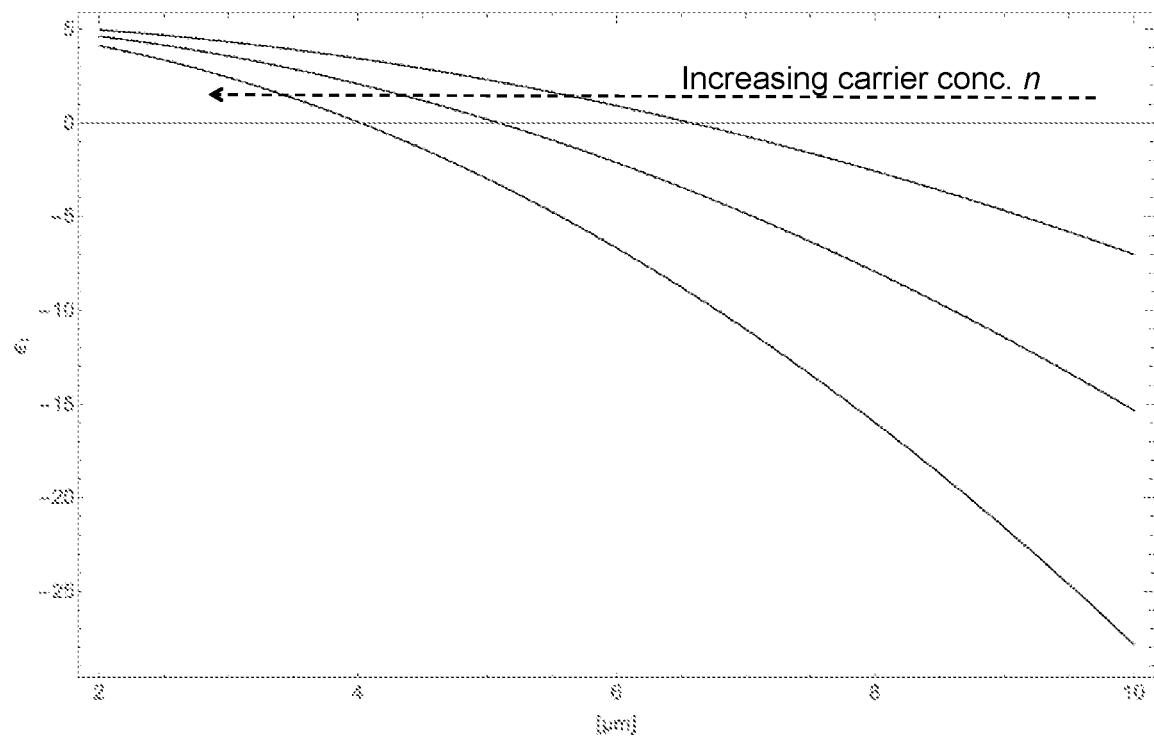
FIG. 2 is a graph illustrating the real part of the Drude law derived dielectric function for a generic semiconductor for three levels of free carrier concentration n.
Figure 3:
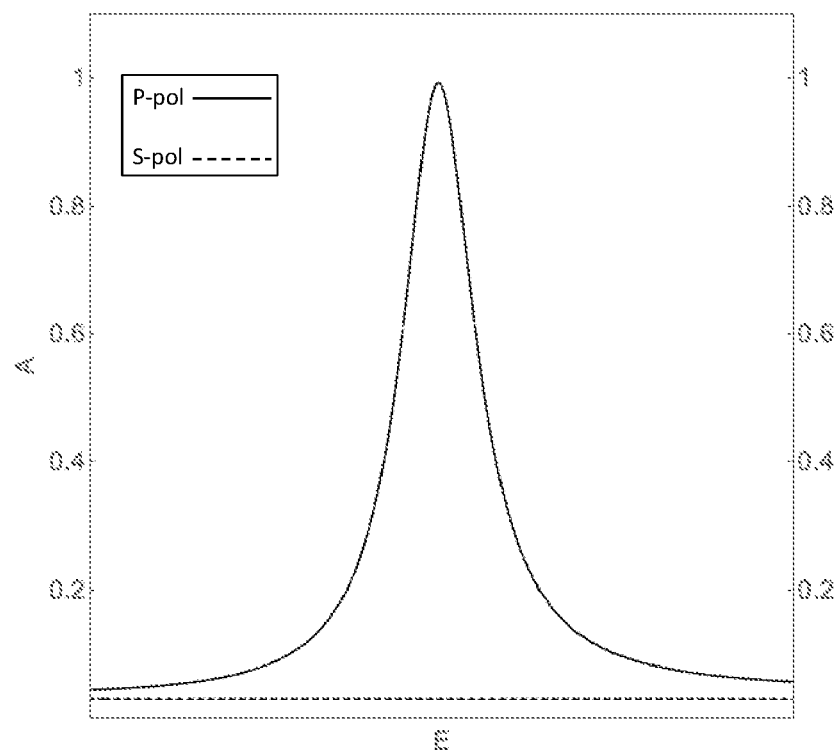
FIG. 3 is a graph illustrating the energy or polarization dependence for a generic ENZ absorber around the ENZ condition for p- and s-polarized light at 60° off surface normal incidence angle.

As described herein an epsilon-near-zero (ENZ) material or layer or medium may refer to any (e.g., plasmonic) material or layer that can be configured to provide ENZ absorption, that is, concentration of electromagnetic field substantially or almost exclusively within the volume of the material or layer or medium. The ENZ material layer 501 can be comprised of semiconductors such as GaAs, InAs, InN, GaN, as well as (semi)-conducting metal oxides (CMOs) such as CdO, ITO, ZnO, CdZnO, and/or doped variants thereof. The ENZ material layer 501 is capable of supporting an optical ENZ absorption mode, at and around the energies at which the ENZ condition is reached (i.e., where the real part of the dielectric functions crosses from positive values to negative values, see FIG. 2), where coupling to the optical ENZ mode results in ENZ absorption. Typical thicknesses of ENZ material layers described herein may not exceed about 1000 nm in some embodiments. For example, ENZ material layers described herein may have thicknesses of about 100 nm to about 900 nm, about 200 nm to about 750 nm, or about 300 nm to about 600 nm.

The reflector layer 502 can be comprised of a metal or other material with high reflectivity (low emissivity) in the infrared or other desired wavelength range of operation, which may allow for and/or improve absorption of the ENZ mode. Typical metals for the reflector layer 502 may include Ag, Au, Al and W with a thickness between about 10-200 nm. In some embodiments, a thin (e.g., <100 nm) metallic adhesion layer comprised of reactive metals such as Mg, Ni, Ti or Cr may be used to facilitate a stronger bond between the substrate 503 and the reflector layer 502. While not separately illustrated, the reflector layer 502 may represent a layer stack including the metallic adhesion layer and the bulk metallic reflector layer deposited thereon in some embodiments. The substrate material 503 can be comprised of semiconductor and/or ceramic substrates such as, but not limited to, Si, Ge, GaAs, $Al_2O_3$ (as sapphire and polycrystalline ceramic), ZnO, GaN, $SiO_2$, BK7 glass and/or other technical glasses.

Figure 4:
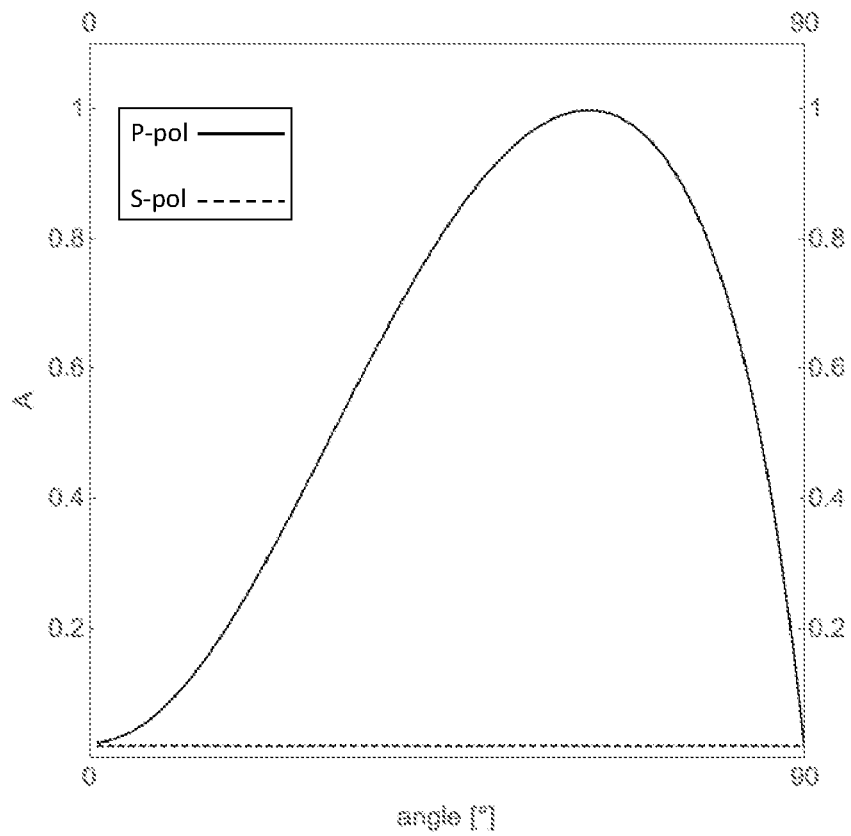
FIG. 4 is a graph illustrating the angle dependence for the generic ENZ absorber of FIG. 3.

In the example configuration depicted in FIG. 5, the angle dependency of the ENZ mode absorption of the layer 501 may be a defining characteristic of the resulting absorptivity/emissivity profile. As described above, in this planar configuration, the ENZ mode can be coupled to at relatively steep angles off the surface normal (see FIG. 4). Furthermore, p-polarized light can couple to the ENZ mode. That is, ENZ absorption may be polarization- and/or angle-dependent in the configuration of FIG. 5.

Figure 6:
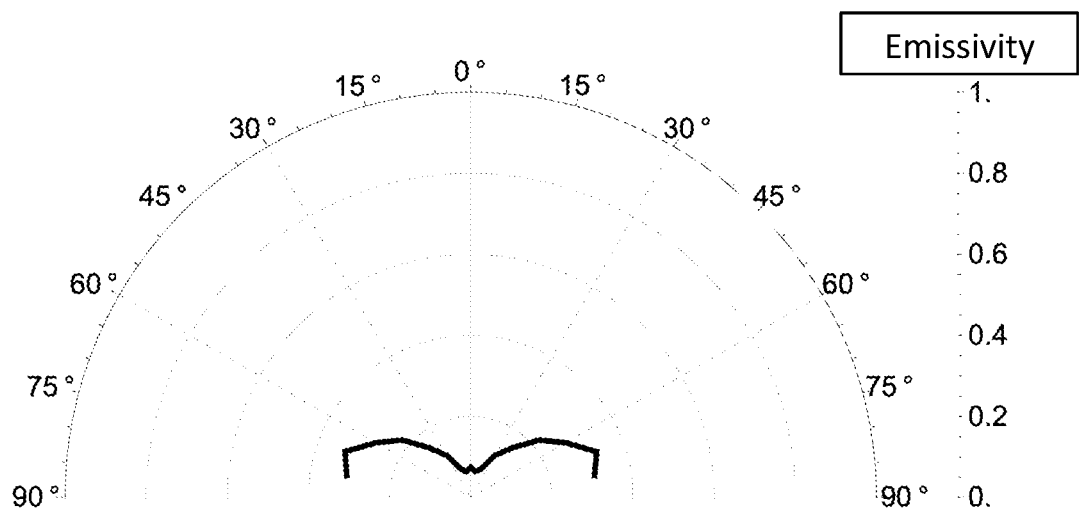
FIG. 6 is a polar plot of experimental angle dependent emissivity/absorptivity at the ENZ wavelength according to some embodiments of the present invention.

FIG. 6 depicts the resulting experimental angle dependent emissivity/absorptivity in a polar plot for a sample in the layered configuration of FIG. 5 measured at the ENZ wavelength. 0° depicts the surface normal, and the measured emissivity is plotted for a range spanning 180° (+−90° off the surface normal). The dataset depicted in FIG. 6 is exemplary for ENZ materials and, in this example, is derived from a CMO film with an ENZ crossover at 4 μm wavelength. As described above, this effect can be tuned across the electromagnetic spectrum by changing the ENZ condition in the polaritonic ENZ layer 501 to the desired wavelength, e.g., by altering the doping concentration of the ENZ layer 501.

In the polar plot in FIG. 6, two symmetrical lobes of emissivity/absorptivity are shown. Consistent with the angle dependency of the absorptivity depicted in FIG. 4, the maximum emissivity may be at angles >50° off the surface normal (0°). The emissivity measured at angles close to the surface normal may be very low, with emissivity values not exceeding 0.2 in a 60° (+−30°) cone around the surface normal (the surface is highly reflective). In this example, the maximum magnitude of the emissivity is found to be close to 0.4. This may be due to the polarization dependence of the polaritonic ENZ mode absorption. Non-polarized or unpolarized light may include a mixture of p-polarized and s-polarized light, for example, a mixture of about 50% p-polarized light and 50% s-polarized light. Thus, the maximum achievable emissivity in this embodiment for non-polarized light may be about 0.5, as only about half of the incident non-polarized light (i.e., the p-polarized light portions) may couple to the ENZ mode.

The embodiment of FIG. 5 is non-blackbody like in its absorptivity/emissivity characteristics and demonstrates an example configuration of a surface with a tunable absorptivity/emissivity feature, while maintaining an overall low emissivity at energies away from the ENZ condition. At the surface normal, the sample is reflective (low emissivity/absorptivity). The tunable optical properties provided by the ENZ material may be accessible at oblique angles off the surface normal. However, it may be desirable in many technical applications for the tunable emissivity/absorptivity to be accessible close to the surface normal. For example, a thermal emitter based on the surfaces shown in FIG. 5 may be of limited use for highly specialized cases if only emitting p-polarized light at oblique angles.

Further embodiments of the present invention may provide surfaces with tunable emissivity/absorptivity and without polarization and/or angular limitations. That is, a film including one or more layers configured for ENZ absorption may be provided with emissivity/absorptivity characteristics that are substantially independent of the polarization and/or angle of incident light.

Figure 7:
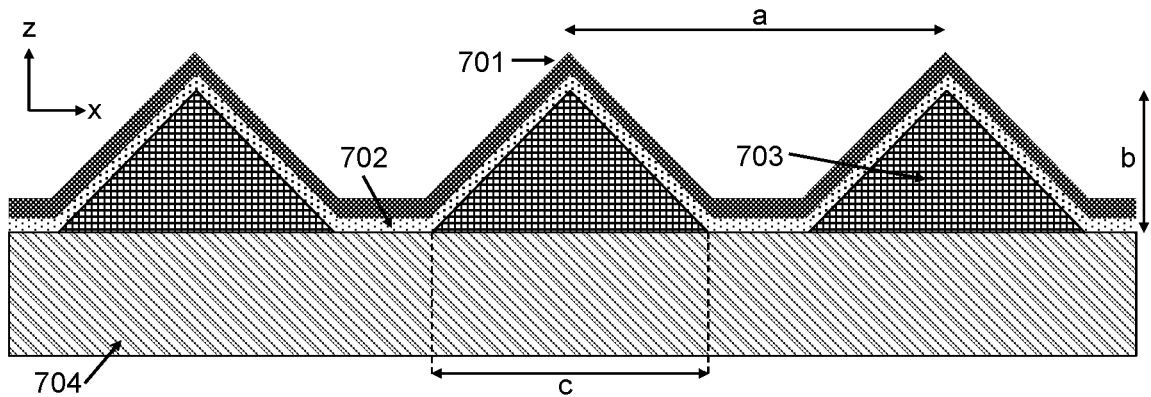
FIG. 7 is a schematic cross-sectional view illustrating structures according to some embodiments of the present invention with two layers on top of a patterned substrate.

FIG. 7 depicts a generalized layout of a further embodiment of the invention in a cross section view along the x- and z-directions. In particular, layer 701 depicts the polaritonic ENZ layer deposited on top of a reflector layer 702. The substrate 704 includes a pattern of surface features (also referred to as a surface pattern) 703 on or protruding from a surface of the bulk substrate 704. The center-to-center spacing along the cross-sectional view of the substrate features 703 is described by the lattice parameter a. The surface feature height is described by parameter b and the surface feature base width is described by parameter c.

The ENZ material layer 701 can be comprised from compound semiconductors, such as GaAs, InAs, InN, GaN, as well as (semi)-conducting metal oxides (CMOs) such as CdO, ITO, ZnO, CdZnO, and/or doped variants thereof. Similar to the embodiment of FIG. 5, the ENZ material 701 is capable of supporting an ENZ absorption mode, at and around the energies at which the ENZ condition is reached (the real part of the dielectric functions crosses from positive values to negative values, see FIG. 2). Typical thicknesses of the ENZ material layer 701 may not exceed about 1000 nm in some embodiments. The reflector layer 702 may likewise be comprised of a metal or other material with high reflectivity (low emissivity) in a particular wavelength range of operation, e.g., the infrared. Typical metals for the reflector layer 702 may include Ag, Au, Al and W with a thickness between about 10-200 nm. In some embodiments, a thin (e.g., <100 nm) metallic adhesion layer comprised of reactive metals such as Mg, Ni, Ti or Cr may be used, e.g., to facilitate a stronger bond.

The surface patterns described herein include any non-planarity or features that protrude from a surface of the substrate with various shapes and/or dimensions that are configured to orient the ENZ material layer(s) so as to achieve emissivity/absorptivity that is largely or substantially polarization- and/or angle-independent. In some embodiments, the ENZ material layer(s) may be configured (e.g., via doping) for operation in one or more desired wavelength ranges (which may include a working wavelength as described herein), while the protruding features may define geometric patterns having one or more dimensions on the order of or otherwise determined based on the desired wavelength range(s) or working wavelength.

The surface patterns 703 are depicted in FIG. 7 with triangular cross sections as an example, but can be comprised of (although not limited to) the following geometrical shapes: semi-spheres, ellipsoids, paraboloids, hyperboloids, triangular base pyramids, and square base pyramids. While described herein by way of example with reference to surface patterns 703 defining features having rotational symmetry about respective axes that are normal to the substrate 704, it will be understood that embodiments of the present invention are not limited to these examples, and may include surface patterns having rotationally-asymmetric or otherwise imperfectly symmetric features. The surface features may be comprised of the same material as the substrate. The substrate 704 may be comprised of semiconductor and/or ceramic substrates such as, but not limited to, Si, Ge, GaAs, $Al_2O_3$ (as sapphire and polycrystalline ceramic), ZnO, GaN, $SiO_2$, BK7 glass and other technical glasses. The reflector layer 702 and the ENZ material layer 701 (and any intervening layers) may be formed on the substrate 704 so as to conform to the surface patterns 703. As such, the ENZ material layer 701 may conformally extend (e.g., with a substantially uniform thickness) along the pattern of surface features 703 such that one or more surfaces thereof are oriented by the surface features to provide emissivity/absorptivity that is substantially independent of the polarization and/or angle of radiation.

Figure 8:
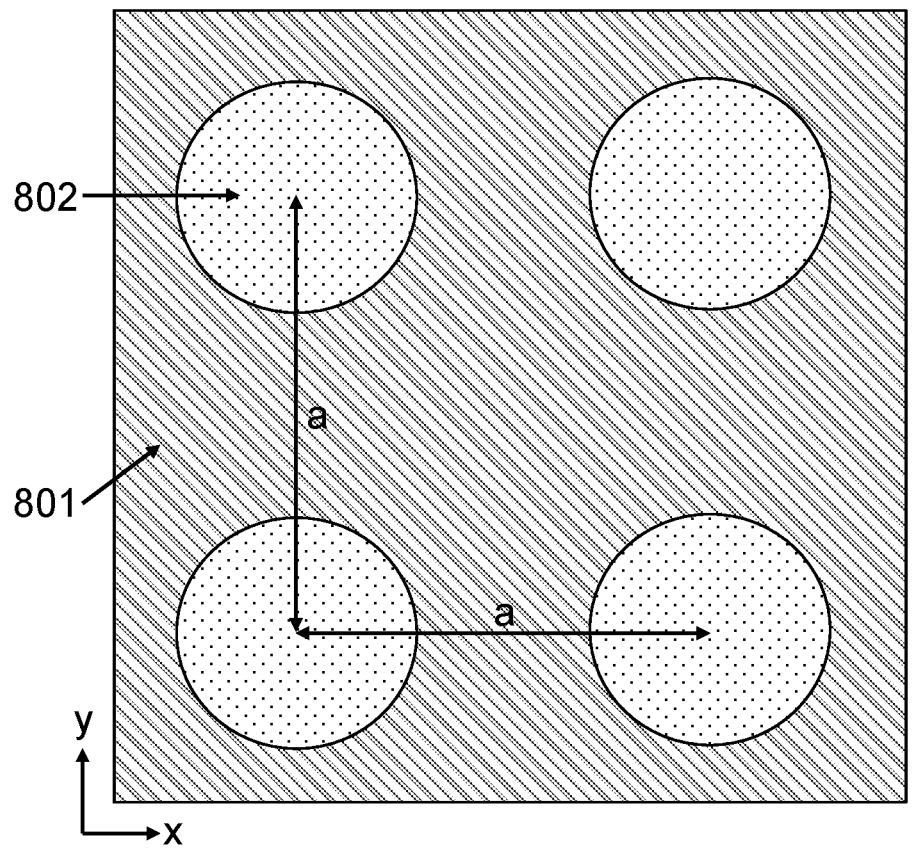
FIG. 8 is a schematic plan or top view of a unit cell showing an example periodic placement of surface features in a square lattice according to some embodiments of the present invention.
Figure 9:
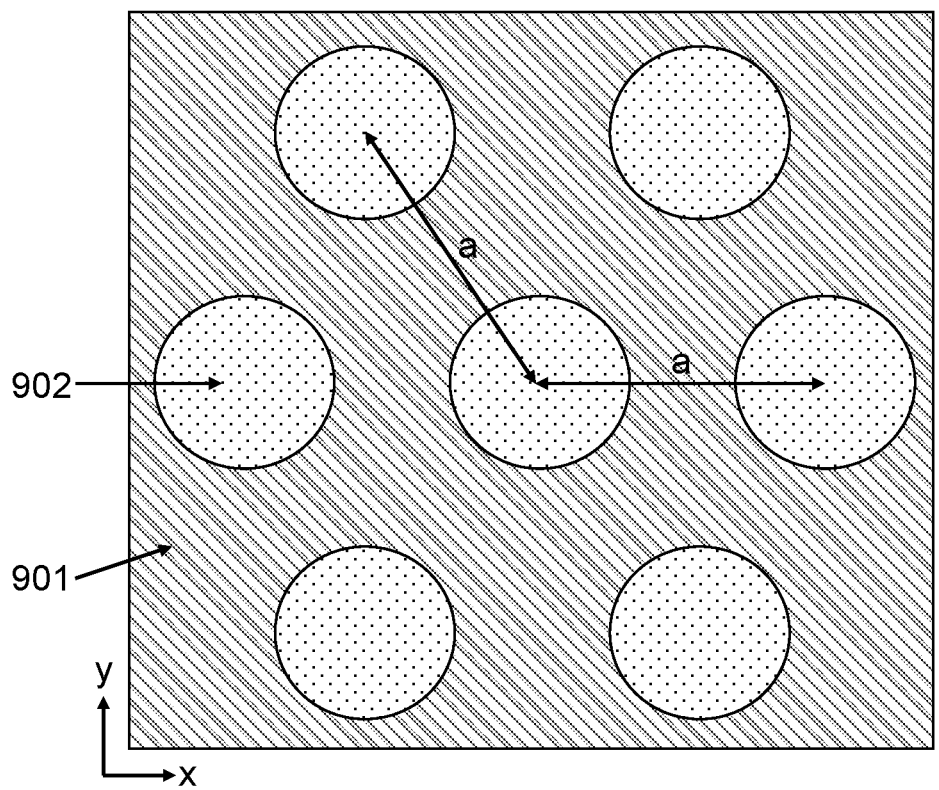
FIG. 9 is a schematic plan or top view of a unit cell showing an example hexagonal placement of surface in a hexagonal lattice according to some embodiments of the present invention.

Some embodiments of the invention include periodic placement patterns of the surface features across the surface plane in one or more dimensions (shown as in x-y direction). FIG. 8 depicts a square placement and FIG. 9 depicts a hexagonal placement. The top view in FIG. 8 depicts the placement of the surface features 802 on the surface of the substrate 801 in a square lattice. FIG. 8 only illustrates a single unit cell, which may characterize portions of or the entirety of an overall lattice defined by the unit cell. That is, to extend the pattern of features 802 across a surface, the unit cell shown in FIG. 8 may be repeated and translated by the lattice parameter a in a periodic arrangement along the x- and/or y-directions. FIG. 9 depicts the hexagonal placement of surface features. The top view in FIG. 9 depicts the placement of the surface features 902 on the surface of the substrate 901 in a hexagonal lattice. FIG. 9 only illustrates a single unit cell, which may characterize portions of or the entirety of an overall lattice defined by the unit cell. That is, to extend the pattern of features 902 across a surface, the unit cell shown in FIG. 9 may be repeated and translated by the lattice parameter a in a periodic arrangement along the x- and/or y-directions. While described herein by way of example with reference to periodic patterns of surface features, it will be understood that embodiments of the present invention are not limited to these examples, and may include surface patterns that are aperiodic and/or otherwise imperfectly periodic.

The individual surface features to be placed in either of the lattices described above with reference to FIGS. 8 and 9 are defined by the overall geometry (semi-sphere, ellipsoid, etc.), with the spacing between surface features defined by the lattice parameter a and the surface feature height b. In some embodiments, in a periodic or non-periodic arrangement, an average spacing or average pitch between adjacent surface features may be about 2 micrometers (μm) to about 7 μm, for example, about 3 μm to about 5 μm.

Some embodiments of the present invention as described herein may allow for modification of surface emissivity/absorptivity across a wide range of wavelengths, e.g., from 2-16 μm, and the required or corresponding surface geometry of the surface features may be scaled with the wavelength requirements. That is, the dimensions of the surface features may correspond to the desired wavelength of operation, referred to herein as a working wavelength (kw), which characterizes the target wavelength of the particular surface design. The range of possible surface features parameters can be defined as a multiple of the working wavelength.

The following ranges for the surface features and lattice parameters may be used in some example embodiments, for purposes of illustration rather than limitation:

Lattice parameter square lattice: 0.5-3 times (×) of λw
Lattice parameter hexagonal lattice: 0.3-3× of λw
Surface feature height: 0.2-2× of λw
Surface feature aspect ratio b/c (height/base width): 0.2-3, e.g., 0.5-2.

For example, for a surface configured to exhibit a high absorptivity/emissivity around 6 μm wavelengths, the working wavelength λw is 6 μm. The disclosed range of dimensions thus follows to be:

Lattice parameter square lattice: 3-18 μm
Lattice parameter hexagonal lattice: 1.8-18 μm
Surface feature height: 1.2-12 μm
Surface feature aspect ratio b/c (height/base width): 0.2-3, e.g., 0.5-2.

The particular geometry of the surface features may impose additional constraints due to the geometric definition of the features. For example, a perfectly semi-spherical surface feature has an aspect ratio of 0.5 (height/base width) and does (by definition) not allow for other ratios. However, it will be understood that embodiments of the present invention may include imperfections and/or imperfectly symmetric surface features, due, for example, to manufacturing techniques and/or tolerances.

Figure 10:
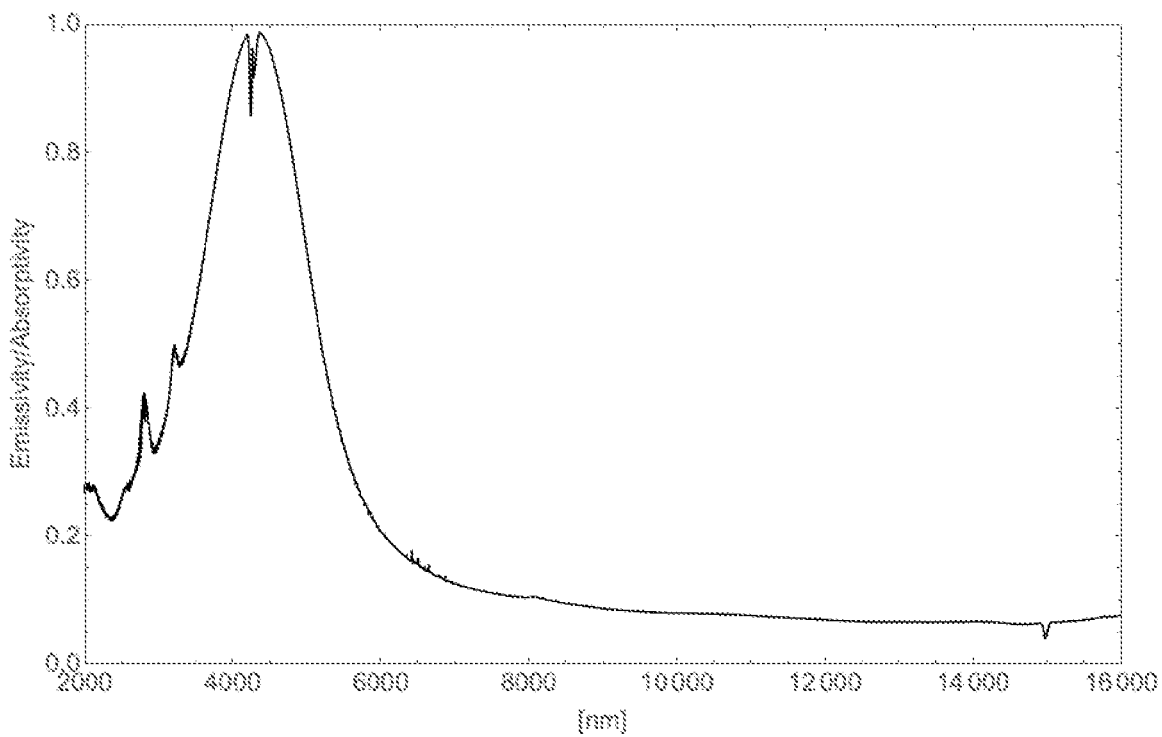
FIG. 10 is a graph illustrating experimental emissivity/absorptivity at the surface normal as a function of wavelength for an example surface according to some embodiments of the invention with an example working wavelength.

The embodiment above may allow for precise control of a surface's emissivity/absorptivity across multiple or all angles of incidence, including the surface normal. Experimental data for a surface prepared according to some embodiments of the present invention is described below with reference to the following parameters by way of example:

Paraboloid surface features
Hexagonal placement, a=3 μm
Feature height b=1.4 μm
Working wavelength λw=4.5 μm In this example, a 200 nm ENZ layer 701 (characterized by a ENZ condition or crossover energy at the working wavelength λw of 4.5 μm) was provided on a 100 nm gold reflector layer 702. In this particular example, a doped CMO was used (CdO doped with Y) as the ENZ material. FIG. 10 depicts the resulting experimental emissivity/absorptivity of the surface measured at the surface normal. Around the working wavelength λw of 4.5 μm, the emissivity/absorptivity reaches the physical maximum of 1. The emissivity/absorptivity is reduced or falls off at wavelengths away from λw and flattens out such that the surface exhibits a substantially uniform emissivity/absorptivity values <0.2 across at wavelength beyond about 6 μm and for the remainder of the wavelength range.

Figure 11:
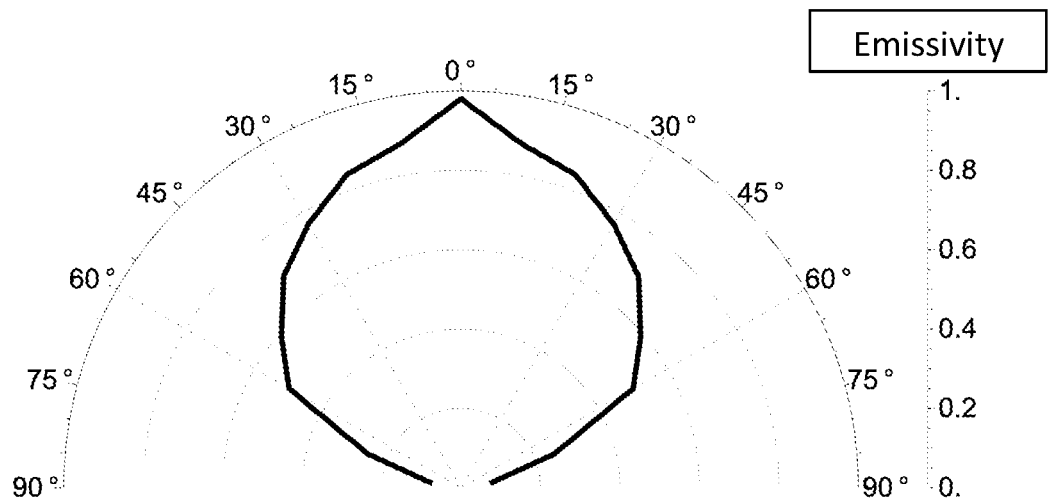
FIG. 11 is a polar plot of experimental angle dependent emissivity/absorptivity for an example surface according to some embodiments of the invention at the example working wavelength.

FIG. 11 depicts a polar plot of the angle dependent emissivity/absorptivity at the example working wavelength λw of 4.5 μm for the sample presented in FIG. 10. 0° depicts the surface normal, and the measured emissivity is plotted for a range spanning 180° (+−90° off the surface normal). The surface features high emissivity at the surface normal approaching the physical limit of 1, with an emissivity of >0.7 at 45° off the surface normal. At angles >60° off the surface normal, the emissivity falls below 0.5. In contrast with the planar, un-patterned substrate (e.g., as shown in FIG. 5), the absorption/emission for this example embodiment of the present invention is polarization-independent, with absorption of all polarizations of light equally likely. This example illustrates that the various surface patterns described herein can dramatically improve the accessibility of the ENZ mode and the resulting emissivity/absorptivity of the surface. Practically speaking, the presented surface is highly absorptive at the working wavelength λw for up to the entire range of incidence angles. At energies away from the working wavelength λw the absorptivity/emissivity may be reduced dramatically, and the surface may become reflective. For comparison, an emissivity/absorptivity of 0.2 is comparable to the emissivity/absorptivity of a smooth metal.

The above experimental data is provided merely by way of example as to how some embodiments of the present invention can implement modification of a surface's emissivity/absorptivity, e.g., in the infrared wavelength range. However, embodiments of the present invention may be configured to provide surfaces with emissivity/absorptivity in other wavelength ranges, such as visible and/or ultraviolet wavelength ranges, by altering one or more properties of the ENZ material layer, the reflector layer, and/or the pattern of surface features based on the desired wavelength range. In particular, the ENZ condition, the reflectivity, and/or the dimension(s) of the surface features may be configured based on a working wavelength in the desired wavelength range. Potential applications of these surfaces may include, but are not limited to, thermal emitters, where the emissivity governs the spectrum that a body/surface emits upon heating.

Figure 12:
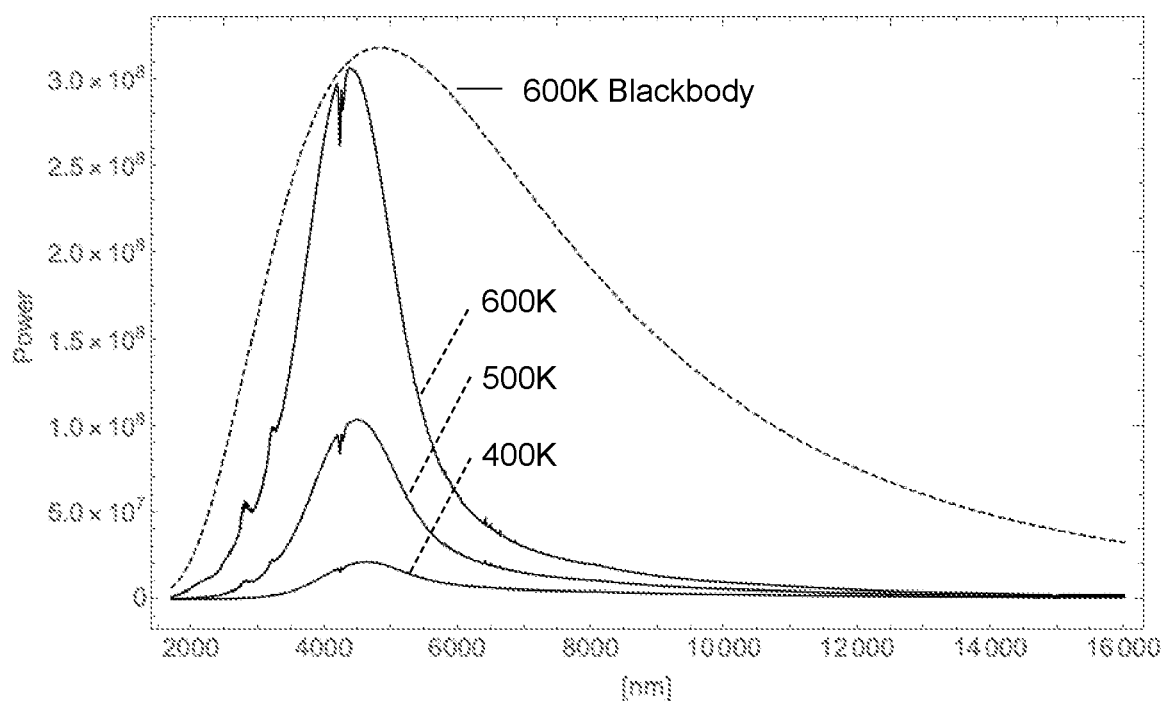
FIG. 12 is a graph illustrating calculated spectral output for an example surface according to some embodiments of the invention as compared to the output of a theoretical black-body spectrum.

FIG. 12 depicts the calculated spectral output of the surface described above with reference to FIGS. 10 and 11 when heated above room temperature at 4 different temperatures of 400K, 500K and 600K, as compared to the output of a theoretical blackbody spectrum at 600K. As shown in FIG. 12, the ENZ absorption and the subsequent narrow absorptivity/emissivity peak provide an emission spectrum with a maximum around the working wavelength λw of the surface, in this case a wavelength of about 4.5 μm. Increasing the temperature emphasizes this effect, as the output power increases; however, the wavelength of peak emission does not shift away from the working wavelength λw with increasing temperature. That is, while the intensity of the emission may increase with temperature, the wavelength range of the emission may be largely temperature-independent. Comparison to the blackbody spectrum at 600K (FIG. 12, dashed line) emphasizes the artificial and narrow nature of the emission when compared to other thermal emitters (light emitters based on other physics, such as LEDs and laser can achieve significantly narrower emission lines). It will be understood that this is only one example given for the working wavelength λw of 4.5 μm. Due to the tunability of the ENZ condition in the disclosed materials for the ENZ layers, this effect can be achieved over a desired wavelength range, for example, the 2-16 μm wavelength range.

The experimental data described and illustrated with reference to FIGS. 10-12 above depict how example embodiments of the present invention can be used to configure a surface with a single absorptivity/emissivity maximum in the 2-16 μm wavelength range. For certain applications however, a more complex pattern of emissivity may be desirable. Still further embodiments of the invention expand on the embodiments discussed above by dividing or otherwise forming the ENZ material layer into multiple sublayers or regions with varying ENZ conditions.

Figure 13:
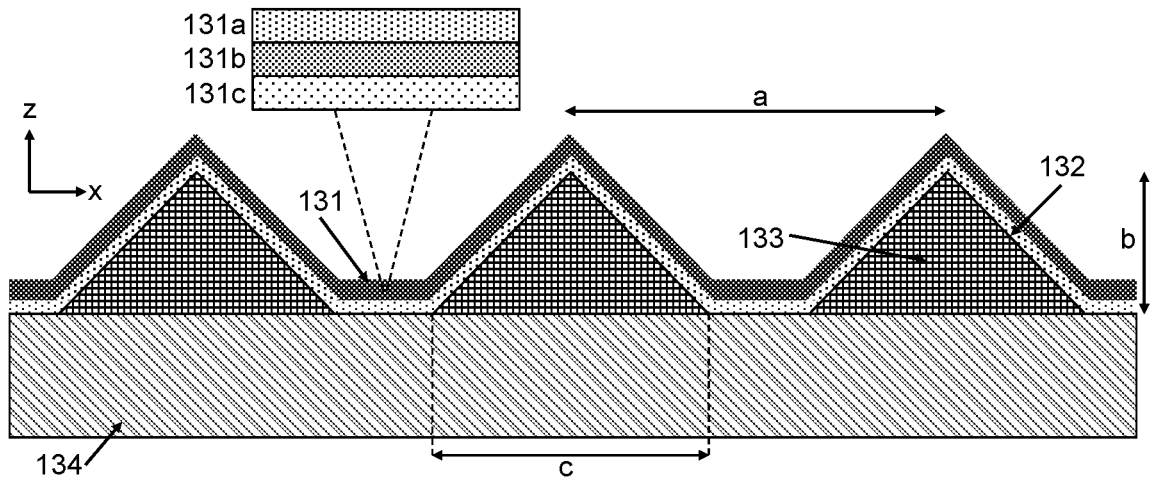
FIG. 13 is a schematic cross-sectional view illustrating structures including multiple sublayers with varying ENZ conditions according to some embodiments of the present invention.

FIG. 13 depicts an embodiment including multiple sublayers, each with a different ENZ condition, in a cross-sectional view. In the embodiment of FIG. 13, the ENZ material layer 131 is subdivided into or otherwise includes multiple layers or portions with differing characteristics over the thickness of the ENZ material layer 131. The embodiment of FIG. 13 depicts three sublayers, but it will be understood that fewer or more ENZ sublayers may be present in other embodiments. To modify the respective ENZ conditions within the ENZ layer(s), the doping concentration can be varied, without changing the material the ENZ layer is comprised of That is, in some embodiments, the sublayers (shown as 131a-131c) may be portions of a same material layer 131 that have different characteristics. Throughout the thickness of the ENZ material layer 131, varying levels of doping concentration may be provided, thus varying the respective ENZ conditions in the wavelength space (i.e., the ENZ condition of each sublayer 131a, 131b, 131c is established at a different wavelength). FIG. 13 depicts this by effectively subdividing the polaritonic layer 131 into three sublayers 131a-131c. Although comprised of the same material (e.g. a CMO), the sublayers 131a-131c optically act independently due to the varied free carrier concentration n and the resulting difference in the ENZ crossover or condition (see FIG. 2) for each sublayer 131a-131c. Layer 132 is the reflector layer, which conformally extends along the surface features 133 on or protruding from the substrate 134. The center-to-center spacing of the surface features 133 is described by the lattice parameter a. The surface feature height is described by b and the surface pattern base width is described by c.

The ENZ material depicted in 131 and the sublayers 131a-131c can be comprised from semiconductors such as GaAs, InAs, InN, GaN, as well as (semi)-conducting metal oxides (CMOs) such as CdO, ITO, ZnO, CdZnO, and/or doped variants thereof. In the example of FIG. 13, the sublayers 131a-131c are comprised of the same material, but with varying doping concentrations and thus respective varying ENZ conditions. However, in other embodiments, one or more of the sublayers 131a-131c may be comprised of different materials than each other, such that the ENZ material layer 131 includes a stack of different material sublayers 131a, 131b, 131c. Typical thicknesses of multilayer ENZ materials described herein may not exceed about 1000 nm for the combined thickness of all sub layers 131a-131c in some embodiments. Similar to the embodiments described above, the reflector layer 132 may be comprised of a metal or other material with high reflectivity (low emissivity) in the infrared wavelength range (e.g., about 2-16 μm). Typical metals for the reflector layer 132 may include Ag, Au, Al and W with a thickness between about 10-200 nm. In some embodiments, a thin (e.g., <100 nm) metallic adhesion layer comprised of reactive metals such as Mg, Ni, Ti or Cr may be used to facilitate a stronger bond between the reflector layer 132 and an underlying layer or substrate 134.

The surface pattern 133 is depicted in FIG. 13 with a triangular cross section as an example, but can be comprised of (although not limited to) the following geometrical shapes: semi-spheres, ellipsoids, paraboloids, hyperboloids, triangular base pyramids and square base pyramids. As noted above, while described by way of example with reference to surface patterns 133 defining features having rotational symmetry about respective axes that are normal to the substrate 134, it will be understood that embodiments of the present invention are not so limited, and may include surface patterns having rotationally-asymmetric or otherwise imperfectly symmetric features. The surface features 133 may be comprised of the same material as the substrate 134, but embodiments of the present invention are not so limited, and in some embodiments the materials of the surface features 133 and the substrate 134 may differ. The substrate material 134 may be comprised of semiconductor and/or ceramic substrates such as, but not limited to, Si, Ge, GaAs, $Al_2O_3$ (as sapphire and polycrystalline ceramic), ZnO, GaN, $SiO_2$, BK7 glass and other technical glasses. The reflector layer 132 and one or more of the ENZ sublayers 131a-131c (and any intervening layers) may be formed on the substrate 134 so as to conform to the surface patterns 133. As such, the ENZ sublayers 131a-131c may conformally extend along the surface features 133 such that one or more surfaces thereof are oriented by the surface features to provide emissivity/absorptivity that is substantially independent of the polarization and/or angle of radiation. While described and illustrated in FIG. 13 with reference to sublayers 131a-131c of a same material having different characteristics (e.g., doping concentrations), some embodiments of the present invention may include sub layers of different materials, e.g. sequentially formed to define the illustrated sub layer stack 131a-131c.

The inclusion of multiple sublayers 131a-131c allows for emissivity/absorptivity spectra with higher complexity for surfaces described herein. Each sublayer 131a-131c can be configured with its own ENZ condition, and thus, may contribute a respective peak in the emissivity/absorptivity of the surface of the layer 131. The total emissivity/absorptivity of the layer 131 may be represented by the linear combination of the individual optical properties of the respective sublayers of the layer 131. A similar placement configuration of the surface features 133 may be used as discussed above with reference to FIGS. 8 and 9, e.g., periodic placement in a rectangular (e.g., square) or hexagonal lattice. However, as also noted above, it will be understood that embodiments of the present invention are not limited to periodic placement, and may include surface patterns or lattice geometries that are aperiodic and/or otherwise imperfectly periodic. As similarly mentioned above, in a periodic or non-periodic arrangement, an average spacing or average pitch between adjacent surface features 133 may be about 2 micrometers (μm) to about 7 μm, for example, about 3 μm to about 5 μm.

Due to the presence of multiple ENZ conditions as provided by the respective sublayers 131a-131c, the working wavelength $\lambda w$ that governs the range of dimensions of the surface features 133 may be defined by the ENZ condition with the longest wavelength (lowest energy) for the embodiment of FIG. 13. In this example, the same ranges for the critical dimensions of the example embodiments discussed above may be used (for purposes of illustration rather than limitation), that is:

Lattice parameter square lattice: 0.5-3× of λw
Lattice parameter hexagonal lattice: 0.3-3× of λw
Surface feature height: 0.2-2× of λw
Surface feature aspect ratio b/c (height/base width): 0.2-3, e.g., 0.5-2.

Calculated data for a surface prepared according to the some embodiments described above is presented using the finite difference time domain (FDTD) method using the following parameters by way of example:
Paraboloid surface features
Hexagonal placement, a=5.25 μm
Feature height b=3 μm
Working wavelength λw=7.25 μm In this example, a 250 nm ENZ layer 131 was provided on a 100 nm gold reflector layer 132. The layer 131 includes two sub-layers 131a and 131b establishing two ENZ conditions at wavelengths of 3.0 μm and 7.25 μm, respectively. The calculated data is based on the use of a doped CMO (CdO) as the ENZ material of the layer 131.

Figure 14:
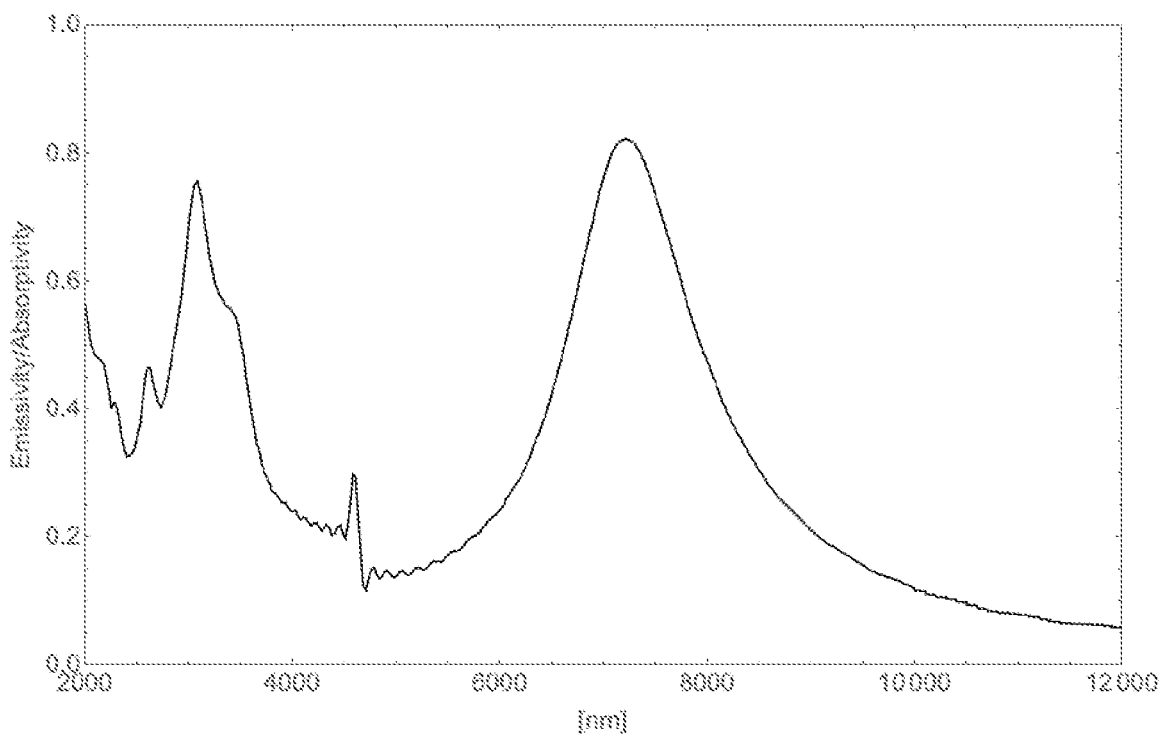
FIG. 14 is a graph illustrating calculated emissivity/absorptivity at the surface normal as a function of wavelength for an example surface according to some embodiments of the invention.

FIG. 14 depicts the resulting emissivity/absorptivity of the surface of the layer 131 at the surface normal as a function of wavelength for these example conditions. The surface exhibits two peaks in emissivity/absorptivity corresponding to the respective ENZ conditions provided by the configurations of the sublayers 131a and 131b at a wavelength of 3.0 μm and at the working wavelength λw of 7.25 μm. The emissivity/absorptivity for each layer reaches about 0.8 at and around the respective ENZ conditions and falls sharply in-between the two desired peaks, showing strongly suppressed emissivity/absorptivity off the desired ENZ wavelengths. That is, the emissivity/absorptivity of the surface of the layer 131 is maximized at about the respective ENZ conditions for the 3.0 μm and 7.25 μm wavelengths, with decreased emissivity/absorptivity at wavelengths other than the desired wavelengths.

Surfaces in accordance with embodiments of the present invention as discussed above may have numerous applications. Due to the more complex absorptivity spectra that can be established (up to three or more distinct or overlapping ENZ conditions in linear combination), devices in accordance with embodiments of the present invention may be used as an infrared calibration target, and/or to artificially design the IR signature of a surface to artificially mimic the IR signatures of other materials. Upon heating, devices in accordance with embodiments of the present invention may be used to create thermal emitters with a complex emission spectrum featuring multiple emissivity peaks across the infrared wavelength range (and/or visible and/or ultraviolet wavelength ranges) with low, metal like emissivity at wavelengths off the ENZ conditions.

Embodiments are described herein with reference to cross-sectional and/or plan view illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, patterns and/or features illustrated as symmetrical and/or periodic may not be perfectly symmetrical and/or perfectly periodic. Thus, the regions illustrated in the figures are schematic in nature and their shapes are not intended to illustrate the actual shape of a region of a device and are not intended to limit the scope of the present inventive concept.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as, illustrated in the figures. It will be understood that the spatially relative terms are intended, to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be denoted by "/".

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the present invention being set forth in the following claims.

The invention claimed is:

1. A device, comprising:
   a substrate comprising a pattern of surface features on a surface thereof, and
   a layer comprising a material having an Epsilon-Near-Zero (ENZ) condition for a wavelength range, wherein the layer is on the surface of the substrate and extends along the pattern of surface features,
   wherein the surface features and/or the pattern thereof comprise at least one dimension that is determined based on the wavelength range, wherein the material comprises a doped semiconductor, and wherein the wavelength range is about 2 micrometers ($\mu$m) to about 16 $\mu$m.

2. The device of claim 1, further comprising:
   a reflector layer extending along the pattern of surface features between the layer and the surface of the substrate,
   wherein a surface of the layer opposite the reflector layer comprises a peak emissivity/absorptivity in the wavelength range.

3. The device of claim 2, wherein the reflector layer comprises Ag, Au, Al, and/or W.

4. The device of claim 3, wherein the reflector layer comprises a layer stack including an adhesion layer on the surface of the substrate and extending along the surface features, wherein the adhesion layer comprises Mg, Ni, Ti, and/or Cr and has a thickness of less than about 100 nanometers (nm).

5. The device of claim 2, wherein the material having the ENZ condition comprises doped CdO, wherein the reflector layer comprises Au, and wherein the substrate comprises $Al_2O_3$.

6. The device of claim 1, wherein the pattern of surface features is configured to orient the layer such that emissivity/absorptivity thereof in the wavelength range is substantially independent of a polarization and/or an angle of radiation.

7. The device of claim 1, wherein the at least one dimension comprises a respective height of the surface features, and wherein the respective height is about 0.2 to about 2 times a wavelength in the wavelength range, or about 1 micrometer ($\mu$m) to about 5 $\mu$m.

8. The device of claim 1, wherein the at least one dimension comprises an aspect ratio of a height to a width of the surface features, and wherein the aspect ratio is about 0.2 to about 3.

9. The device of claim 1, wherein the surface features define respective shapes protruding from the surface of the substrate, wherein the respective shapes comprise semispheres, ellipsoids, paraboloids, hyperboloids, triangular base pyramids, and/or square base pyramids.

10. The device of claim 1, wherein the pattern of surface features defines a periodic pattern along one or more directions on the surface of the substrate.

11. The device of claim 1, wherein an average pitch between adjacent ones of the surface features is about 2 micrometers ($\mu$m) to about 7 $\mu$m.

12. The device of claim 1, wherein the layer comprises a plurality of sublayers having respective ENZ conditions for one or more subranges of the wavelength range.

13. The device of claim 12, wherein the plurality of sublayers comprise three or more sublayers comprising different materials and/or different doping concentrations.

14. The device of claim 1, wherein the material having the ENZ condition comprises GaAs, InAs, InN, GaN, CdO, ITO, ZnO, CdZnO, and/or doped variants thereof.

15. The device of claim 1, wherein the substrate comprises Si, Ge, GaAs, $Al_2O_3$, ZnO, GaN, Ge, $SiO_2$, BK7 glass, and/or technical glasses.

16. A device, comprising:
   a substrate comprising a pattern of surface features on a surface thereof, and
   a layer comprising a material having an Epsilon-Near-Zero (ENZ) condition for a wavelength range, wherein the layer is on the surface of the substrate and extends along the pattern of surface features,
   wherein the surface features and/or the pattern thereof comprise at least one dimension that is determined based on the wavelength range, and wherein the pattern of surface features defines a square or hexagonal lattice in plan view.

17. The device of claim 16, wherein the square lattice comprises a lattice parameter of about 0.5 to about 3 times a wavelength in the wavelength range, or about 3 micrometers ($\mu$m) to about 18 $\mu$m.

18. The device of claim 16, wherein the hexagonal lattice comprises a lattice parameter of about 0.3 to about 3 times a wavelength in the wavelength range, or about 2 micrometers ($\mu$m) to about 7 $\mu$m.

19. A device, comprising:
   a reflector layer;
   an Epsilon-Near-Zero (ENZ) material layer on the reflector layer, wherein the ENZ material layer comprises a surface opposite the reflector layer having an ENZ condition in a wavelength range of about 2 micrometers ($\mu$m) to about 16 $\mu$m, wherein emissivity/absorptivity of the ENZ material layer in the wavelength range is substantially independent of a polarization and/or an angle of radiation; and
   a substrate comprising a pattern of surface features, wherein the reflector layer and the ENZ material layer are sequentially stacked on the substrate and extend along the pattern of surface features.

20. The device of claim 19, wherein the surface features and/or the pattern thereof comprise at least one dimension that is determined based on the wavelength range.

21. The device of claim 20, wherein the pattern of surface features defines a square or hexagonal lattice in plan view.

22. The device of claim 19, wherein the ENZ material layer comprises a plurality of sublayers having respective ENZ conditions for one or more subranges of the wavelength range.

23. The device of claim 22, wherein the plurality of sublayers comprise three or more sublayers comprising different semiconductor materials and/or different doping concentrations.

24. The device of claim 19, wherein the ENZ material layer comprises GaAs, InAs, InN, GaN, CdO, ITO, ZnO, CdZnO, and/or doped variants thereof.

25. A method of fabricating a surface with emissivity/absorptivity for a wavelength range, the method comprising:

providing a substrate comprising a pattern of surface features on a surface thereof, and forming a layer on the surface of the substrate and extending along the pattern of surface features, wherein the layer comprises a material having an Epsilon-Near-Zero (ENZ) condition for a wavelength range, and wherein the layer comprises a plurality of sublayers having respective ENZ conditions for one or more subranges of the wavelength range.

26. The method of claim 25, further comprising:

forming a reflector layer on the surface of the substrate and extending along the pattern of surface features prior to forming the layer having the ENZ condition, wherein a surface of the layer opposite the reflector layer comprises a peak emissivity/absorptivity in the wavelength range.

27. The method of claim 25, wherein the pattern of surface features is configured to orient the layer such that emissivity/absorptivity thereof in the wavelength range is substantially independent of a polarization and/or an angle of radiation.

28. The method of claim 25, wherein the surface features and/or the pattern thereof comprise at least one dimension that is determined based on the wavelength range.

29. The method of claim 28, wherein the material comprises a doped semiconductor, and wherein the wavelength range is about 2 micrometers (μm) to about 16 μm.

30. The method of claim 28, wherein the pattern of surface features defines a square or hexagonal lattice in plan view.

31. The method of claim 25, wherein the plurality of sublayers comprise three or more sublayers comprising different materials and/or different doping concentrations.

32. The method of claim 25, wherein the material having the ENZ condition comprises GaAs, InAs, InN, GaN, CdO, ITO, ZnO, CdZnO, and/or doped variants thereof.

* * * * *